Patented Jan. 8, 1952

2,581,936

UNITED STATES PATENT OFFICE 2,581,936

REACTION OF SUBSTITUTED SULFENAMIDES WITH KETONES AND USE OF REACTION PRODUCT IN RUBBER VULCANIZATION

Edward L. Carr, Akron, Ohio, assignor to The Firestone Tire & Rubber Company, Akron, Ohio, a corporation of Ohio No Drawing. Application July 2, 1949, Serial No. 102,937

23 Claims. (Cl. 260—306.6)

This invention relates to reaction products of ketones and sulfenamides and to the method of producing the same. The sulfenamides contemplated are the thiazole, thiazoline and thiocarbamyl sulfenamides having at least one hydrogen atom directly attached to the amido nitrogen atom. This class of substituted sulfenamides has heretofore found utility as rubber vulcanization accelerators and also as fungicides, but many members of the class are liquids or melt at low temperatures and decompose in storage under ordinary atmospheric conditions.

It is an object of the invention to produce higher melting and more stable compositions from the above class of substituted sulfenamides. Other objects will be apparent in the description of the invention which follows.

The objects of the invention are realized by reacting a substituted sulfenamide of the above class with a ketone. The reaction may be carried out by intimately mixing the sulfenamide with the ketone and allowing the mixture to stand at ordinary or room temperature. When liquid ketones are employed, no other solvent is ordinarily necessary, since it is usually desirable to use an excess of the ketone in order completely to dissolve the sulfenamide. In some cases, however, an inert solvent, such as benzene, gasoline or the like, may be added to insure complete mixing of the two reactants. High reaction temperatures are ordinarily to be avoided, since decomposition and/or resinification often occurs at temperatures in the order of 100° C. or higher.

The exact nature of the reaction and products of the invention is not completely understood. Although it is believed that one or more condensation reactions may be involved, the apparently complex structures of the reaction products of the invention has made it difficult to assign chemical structures to them with confidence.

The sulfenamides suitable for use in the reaction of the invention are represented by the following formulas:

I. Thiazole sulfenamides:

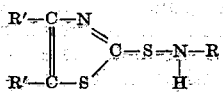

II. Thiazoline sulfenamides:

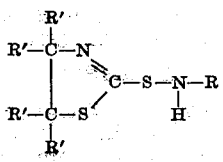

III. Thiocarbamyl sulfenamides:

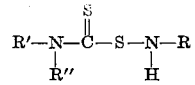

wherein R and R', which may all be the same or different, are hydrogen, a hydrocarbon alkyl (including hydrocarbon cycloalkyl), hydrocarbon aryl, hydrocarbon aralkyl, furfuryl or tetrahydrofurfuryl radicals; R" is a hydrocarbon alkyl (including hydrocarbon cycloalkyl), hydrocarbon aryl, hydrocarbon aralkyl, furfuryl or tetrahydrofurfuryl radical. Furthermore, in Formula I the two R' groups may join with the double-bonded carbons to form an arylene radical, such as benzo, naphtho, tetrahydrobenzo and the like, and in Formula III the R' and R" may join with the adjacent nitrogen to form a heterocyclic radical in which R'R" is alkylene or alkylene-oxy-alkylene, such as piperidyl, morpholyl and similar heterocyclic radicals.

Typical examples of suitable substituted sulfenamides are the following:

N-methyl-4-methylthiazole sulfenamide
N-cyclohexyl-4-methylthiazole sulfenamide
N-cyclohexyl-4-ethylthiazole sulfenamide
N-cyclohexyl-4,5-dimethylthiazole sulfenamide
N-isopropyl-4-methylthiazole sulfenamide
4-methylthiazole sulfenamide
Thiazole sulfenamide
Benzothiazole sulfenamide
N-cyclohexyl benzothiazole sulfenamide
N-isopropyl benzothiazole sulfenamide
Dimethylthiocarbamyl sulfenamide
Cyclopentamethylenethiocarbamyl sulfenamide
N-cyclohexyl cyclopentamethylenethiacarbamyl sulfenamide
N-cyclohexyl dimethylthiocarbamyl sulfenamide
Thiazoline sulfenamide
N-cyclohexyl thiazoline sulfenamide
N-isopropyl thiazoline sulfenamide
N-ethyl thiazoline sulfenamide
N - cyclohexyl - 4,4 - dimethylthiazoline sulfenamide
N-furfuryl thiazoline sulfenamide
N-tetrahydrofurfuryl thiazole sulfenamide
N-cyclohexyl naphthothiazole sulfenamide
N - tetrahydrofurfuryl difurfurylthiacarbamyl sulfenamide
N - cyclohexyl tetrahydrobenzothiazole sulfenamide
N-isopropyl tetrahydrobenzothiazole sulfenamide
Tetrahydrobenzothiazole sulfenamide In addition to the sulfenamide vulcanization accelerators mentioned above, other known sulfenamide accelerators having a hydrogen atom directly attached to the amido nitrogen atom may be utilized in the invention, for example, as disclosed in the following United States patents: 2,271,834, 2,339,552, 2,367,827, 2,381,384, 2,381,392 and 2,445,722.

Examples of some suitable ketones are the following:

Acetone
Methyl ethyl ketone
Methyl propyl ketone
Methyl butyl ketone
Methyl isopropyl ketone
Di-isopropyl ketone
Acetonyl acetone
Mesityl oxide
Phorone
Isophorone
Methyl vinyl ketone
Benzal acetone
Acetophenone
Benzophenone
Acetonaphthone
Cyclohexanone
Cyclopentanone The following examples are given to illustrate the invention, although it is to be understood that homologs and other reactants, such as those listed above, may be substituted for the specific reactants of the examples in practicing the invention.

EXAMPLE 1

N-cyclohexyl benzothiazole sulfenamide was dissolved in acetone. In the course of 20 minutes' standing at room temperature, crystals precipitated with a slight heat of reaction. The melting point of the crystals was 185° C., in comparison with a melting point of 102° C. for the reactant sulfenamide.

EXAMPLE 2

A quantity of N-isopropyl benzothiazole sulfenamide (melting point 93° C.) was dissolved in acetone. After standing a few minutes at room temperature, a crystalline product separated. This product had a melting point of 139° C.

The product of Example 1 was tested as a rubber vulcanization accelerator in the following testing formula:

| Ingredients | Parts by weight |
| --- | --- |
| Rubber | 100 |
| Sulfur | 3 |
| Stearic acid | 1.10 |
| Zinc oxide | 5 |
| Accelerator | 0.75 |

The test results are recorded in the Table I.

Table I

| | 600% Modulus in lbs./in.² | | | | Tensile Strength in lb/in.² | | | |
| --- | --- | --- | --- | --- | --- | --- | --- | --- |
| Cure in minutes @ 240° F. | 30 | 60 | 90 | 120 | 30 | 60 | 90 | 120 |
| Product of Example 1 | 75 | 25 | 25 | 50 | 75 | 25 | 25 | 100 |

| | 600% Modulus in lbs./in.² | | | | Tensile Strength in lbs./in.² | | | |
| --- | --- | --- | --- | --- | --- | --- | --- | --- |
| Cure in minutes @ 280° F. | 20 | 40 | 60 | 100 | 20 | 40 | 60 | 100 |
| Product of Example 1 | 75 | 400 | 700 | 900 | 175 | 1,950 | 2,350 | 2,000 |

Thus it is seen that the product of Example 1 is an effective delayed-action accelerator, since it produced substantially no vulcanization of the rubber at the low vulcanizing temperature of 240° F., indicating that rubber compositions utilizing the products of the invention as accelerators are unusually free of any tendency to set-up or pre-cure during processing in the rubber factory, since temperatures as high as 240° F. often are reached in the banbury and during some tubing operations. On the other hand, the high physical properties produced by curing at the usual vulcanizing temperature of 280° F. show that the products of the invention are excellent accelerators.

EXAMPLE 3

The reaction of Example 1 was repeated, using purer reactants, longer reaction time and purification of the product. Twenty-six grams (0.1 mole) of purified N-cyclohexyl benzothiazole sulfenamide (M. P. 102–104° C.) was dissolved in 125 ml. of redistilled C. P. acetone. The mixture was allowed to stand at room temperature overnight, and then the resulting precipitate was separated by filtration and recrystallized from toluene. The purified product, melting at 212° C., was obtained in a yield of 8 grams. Chemical analysis of the purified product resulted in the following figures:

Found: C, 59.6%; H, 5.5%; N, 8.4%; S, 27.1%.
Calculated for $C_{23}H_{25}N_3S_4$: C, 58.4%; H, 5.3%; N, 8.9%; S, 27.2%.

Thus the product apparently resulted from condensation of 2 moles of the sulfenamide with 1 mole of acetone, with the elimination of 1 mole of water and 1 mole of cyclohexylamine. The following structure is proposed for this reaction product:

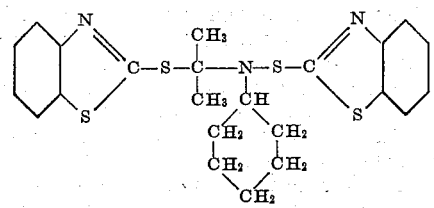

EXAMPLE 4

The reaction of Example 2 was repeated under carefully controlled conditions to produce a sample of product for analysis. Twenty-two grams (0.1 mole) of purified N-isopropyl benzothiazole sulfenamide (M. P. 97–99° C.) was dissolved in 125 ml. of purified acetone contained in a glass stoppered flask. The solution was stored in the dark under nitrogen at room temperature. After 5 days the excess acetone was removed under reduced pressure, the flask being heated in a water bath, the temperature of which did not exceed 75° C. A very viscous reddish-brown residue remained. The residue was dissolved in toluene, from which recrystallization of the reaction product was effected by addition of petroleum ether at ice temperatures. After 3 recrystallizations, a white crystalline solid melting at 132–134° C. was obtained. On analysis, this product was found to contain 58.1% of carbon and 4.8% of hydrogen.

EXAMPLE 5

Fifteen grams (0.06 mole) of recrystallized N-cyclohexyl diethylthiocarbamyl sulfenamide (M. P. 67–68° C.) was reacted with acetone in accordance with the procedure of Example 4. After 5 days at room temperature a dark solution resulted. The residue remaining after removal of excess acetone was dissolved in toluene and the crystalline product thrown out by addition of petroleum ether. The product was then recrystallized from toluene. Yield 7 grams of white crystals melting at 119–120° C. Analysis showed the product to contain 56.5% of carbon and 10.3% of hydrogen.

EXAMPLE 6

Ten grams of N-isopropyl benzothiazole sulfenamide (M. P. 97–99° C.) was dissolved in sufficient methyl ethyl ketone to insure solution, and the solution was allowed to stand at room temperature for 10 days. After removal of volatile material from the reaction mixture, as in previous examples, the residue was crystallized from toluene-petroleum ether as 2.5 grams melting at 98–105° C. The product was recrystallized from n-heptane to yield a pure white crystalline substance melting at 108–110° C. and analyzing 59.6% of carbon and 6.76% of hydrogen.

EXAMPLE 7

Ten grams of N-isopropyl benzothiazole sulfenamide (M. P. 97–99° C.) was dissolved in 38.5 grams of pentanone-2. After the mixture had stood at room temperature for 10 days, the volatile material was removed therefrom by distillation under reduced pressure. The residue was crystallized from n-heptane to yield 4.1 grams of a white crystalline solid melting at 125–128° C. and analyzing 59.7% of carbon and 7.2% of hydrogen.

EXAMPLE 8

Ten grams of N-isopropyl benzothiazole sulfenamide was dissolved in 57 grams of methyl hexyl ketone, and the mixture was allowed to stand at room temperature for 2 weeks. Volatile material was then removed from the reaction mixture under a 9 mm. vacuum. The oily residue was treated with petroleum ether, cooled and stirred to crystallize. The crystals were separated and recrystallized from toluene-petroleum ether to yield a white crystalline substance melting at 117–119° C. and analyzing 51.4% of carbon and 5.4% of hydrogen.

EXAMPLE 9

Ten grams of N-isopropyl benzothiazole sulfenamide was dissolved in 54 grams of acetophenone, and the mixture was allowed to stand at room temperature for 3 weeks. Volatile material was then removed from the reaction mixture under a vacuum of 1.5 mm. The oily residue was precipitated as a solid by treatment with petroleum ether, and the solid product was then recrystallized from toluene to yield 6.5 grams of a white crystalline substance melting at 177–179° C. Since this melting point is similar to the melting point of 2,2'-dithiobis-benzothiazole (often obtained as a byproduct from reactions involving substituted benzothiazole sulfenamides), a mixed melting point of the reaction product with purified 2,2'-dithiobis-sulfenamide (M. P. 181–182° C.) was determined, and found to be 160–170° C., thus proving that the reaction product was not this unwanted, possible byproduct. The reaction product was shown on analysis to contain 59.8% of carbon and 3.7% of hydrogen.

EXAMPLE 10

Ten grams of N-isopropyl benzothiazole sulfenamide were dissolved in 44 grams of cyclohexanone, and the mixture was allowed to stand at room temperature for 4 weeks. The volatile material was then removed under vacuum from the reaction mixture. The oily residue failed to crystallize by treatment with n-heptane or toluene or a mixture of ether and n-heptane. However, this oil was definitely largely the desired reaction product, since it was observed to possess substantially different physical and chemical properties from those of the reactants. It was anticipated that a crystalline product would be obtained upon purification of the oily product by molecular distillation, but the necessary apparatus for this method of purification was not available.

Although no catalysts were employed in the reactions set out in the examples, the use of appropriate catalysts is contemplated by the invention. Since it is likely that certain condensation reactions are involved in the reaction of the invention, it will be apparent to those skilled in the art to use certain condensation catalysts to speed up the reaction.

From the above detailed description of the invention it is apparent that the objects are accomplished by the discovery that substituted sulfenamide accelerators may be converted into higher melting and more stable new compounds, which are also delayed-action vulcanization accelerators by reaction with a ketone.

What is claimed is:

1. A reaction product of a ketone and a sulfenamide having at least one hydrogen atom attached to the amido nitrogen atom thereof and selected from the group consisting of thiazoline, thiazole and thiocarbamyl sulfenamides.

2. A reaction product of a ketone and a thiazole sulfenamide of the formula

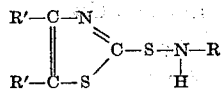

wherein R and R' are selected from the group of radicals consisting of hydrogen, hydrocarbon alkyl, hydrocarbon aryl, hydrocarbon aralkyl, furfuryl and tetrahydrofurfuryl and also wherein the two R' groups form with the double-bonded carbon atoms a radical from the group consisting of arylene and partially hydrogenated arylene.

3. A reaction product of a ketone and a thiazoline sulfenamide of the formula

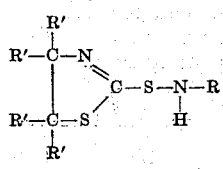

wherein R and R' are selected from the group of radicals consisting of hydrogen, hydrocarbon alkyl, hydrocarbon aryl, hydrocarbon aralkyl, furfuryl and tetrahydrofurfuryl.

4. A reaction product of a ketone and a thiocarbamyl sulfenamide of the formula

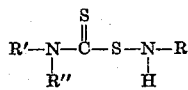

wherein R and R' are selected from the group of radicals consisting of hydrogen, hydrocarbon alkyl, hydrocarbon aryl, hydrocarbon aralkyl, furfuryl and tetrahydrofurfuryl, R'' is selected from the group of radicals consisting of hydrocarbon alkyl, hydrocarbon aryl, hydrocarbon aralkyl, furfuryl and tetrahydrofurfuryl, and also wherein NR'R'' is a heterocyclic radical in which R'R'' is selected from the group of radicals consisting of alkylene and alkylene-oxy-alkylene.

5. A reaction product of a methyl ketone and a sulfenamide vulcanization accelerator having at least one hydrogen atom attached to the amido nitrogen atom thereof.

6. A reaction product of acetone and N-cyclohexyl benzothiazole sulfenamide.

7. A reaction product of acetone and N-isopropyl benzothiazole sulfenamide.

8. A reaction product of acetone and N-cyclohexyl diethylthiocarbamyl sulfenamide.

9. The method of making a relatively high melting, stable composition of matter which comprises reacting a ketone with a sulfenamide having at least one hydrogen atom attached to the amido nitrogen atom thereof and selected from the group consisting of thiazoline, thiazole and thiocarbamyl sulfenamides.

10. The method of making a relatively high melting, stable composition of matter which comprises reacting a ketone with a thiazole sulfenamide of the formula

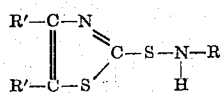

wherein R and R' are selected from the group of radicals consisting of hydrogen, hydrocarbon alkyl, hydrocarbon aryl, hydrocarbon aralkyl, furfuryl and tetrahydrofurfuryl and also wherein the two R' groups form with the double-bonded carbon atoms a radical from the group consisting of arylene and partially hydrogenated arylene.

11. The method of making a relatively high melting, stable composition of matter which comprises reacting a ketone with a thiazoline sulfenamide of the formula

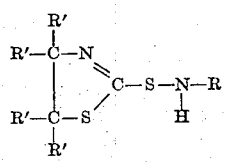

wherein R and R' are selected from the group of radicals consisting of hydrogen, hydrocarbon alkyl, hydrocarbon aryl, hydrocarbon aralkyl, furfuryl and tetrahydrofurfuryl.

12. The method of making a relatively high melting stable composition of matter which comprises reacting a ketone with a thiocarbamyl sulfenamide of the formula

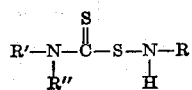

wherein R and R' are selected from the group of radicals consisting of hydrogen, hydrocarbon alkyl, hydrocarbon aryl, hydrocarbon aralkyl, furfuryl and tetrahydrofurfuryl, R'' is selected from the group of radicals consisting of hydrocarbon alkyl, hydrocarbon aryl, hydrocarbon aralkyl, furfuryl and tetrahydrofurfuryl, and also wherein NR'R'' is a heterocyclic radical in which R'R'' is selected from the group of radicals consisting of alkylene and alkyleneoxy-alkylene.

13. The method of making a relatively more stable and higher melting vulcanization accelerator which comprises reacting a methyl ketone with a sulfenamide vulcanization accelerator having at least one hydrogen atom attached to the amido nitrogen atom thereof.

14. The method which comprises reacting acetone with N-cyclohexyl benzothiazole sulfenamide.

15. The method which comprises reacting acetone with N-isopropyl benzothiazole sulfenamide.

16. The method which comprises reacting acetone with N-cyclohexyl diethylthiocarbamyl sulfenamide.

17. The method of vulcanizing rubber which comprises heating rubber and a relatively small amount of sulfur in the presence of a relatively small amount of reaction product of a ketone and a sulfenamide having at least one hydrogen atom attached to the amido nitrogen atom thereof and selected from the group consisting of thiazoline, thiazole and thiocarbamyl sulfenamides.

18. A vulcanizable composition comprising rubber, a relatively small amount of sulfur and a relatively small amount of reaction product of a ketone and a sulfenamide having at least one hydrogen atom attached to the amido nitrogen atom thereof and selected from the group consisting of thiazoline, thiazole and thiocarbamyl sulfenamides.

19. The vulcanized product resulting from the method of claim 17.

20. A reaction product of methyl ethyl ketone and N-isopropyl benzothiazole sulfenamide.

21. A reaction product of acetophenone and N-isopropyl benzothiazole sulfenamide.

22. The method which comprises reacting methyl ethyl ketone with N-isopropyl benzothiazole sulfenamide.

23. The method which comprises reacting acetophenone with N-isopropyl benzothiazole sulfenamide.

EDWARD L. CARR.

REFERENCES CITED

The following references are of record in the file of this patent:

UNITED STATES PATENTS

| Number | Name | Date |
| --- | --- | --- |
| 2,260,380 | Jones | Oct. 28, 1941 |
| 2,331,749 | Watt | Oct. 12, 1943 |
| 2,339,552 | Carr | Jan. 18, 1944 |
| 2,419,294 | Skaptason | Apr. 22, 1947 |
| 2,441,032 | Paul | May 4, 1948 |
| 2,476,688 | Tewksburg | July 19, 1949 |
| 2,476,818 | Carr et al. | July 19, 1949 |